Figure 1:
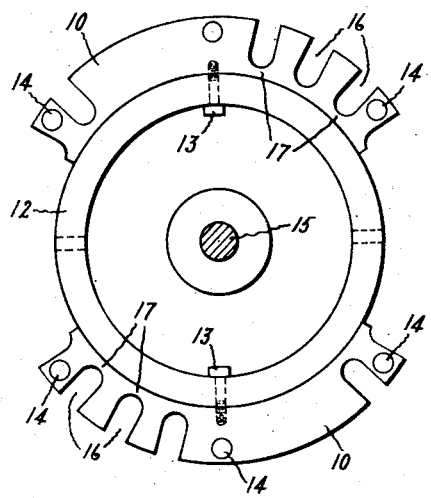

S. R. BERGMAN.
DYNAMO ELECTRIC MACHINE.
APPLICATION FILED OCT. 18, 1915.

1,257,178.

Patented Feb. 19, 1918.
2 SHEETS—SHEET 1.

Inventor:
Sven R. Bergman,
by Albert G. Davis
His Attorney.

UNITED STATES PATENT OFFICE.

SVEN R. BERGMAN, OF NAHANT, MASSACHUSETTS, ASSIGNOR TO GENERAL ELECTRIC COMPANY, A CORPORATION OF NEW YORK.

DYNAMO-ELECTRIC MACHINE.

1,257,178.  Specification of Letters Patent.  Patented Feb. 19, 1918.

Application filed October 18, 1915. Serial No. 56,401.

*To all whom it may concern:*

Be it known that I, SVEN R. BERGMAN, a subject of the King of Sweden, residing at Nahant, in the county of Essex, State of Massachusetts, have invented certain new and useful Improvements in Dynamo-Electric Machines, of which the following is a specification.

My invention relates to dynamo-electric machines, and in particular to dynamo-electric machines in which the field member or stator is provided with a distributed winding. My invention more particularly relates to direct current dynamo-electric machines in which the stator has an inner periphery provided with a plurality of distributed slots carrying a field winding for producing an exciting flux for the machine and for neutralizing the armature reaction.

The object of my invention is to provide a novel construction and a novel method of assembling the parts of a dynamo-electric machine. More particularly, the object of my invention is to provide a dynamo-electric machine having a novel and improved field magnet structure carrying in closed slots a distributed field winding for producing an exciting flux for the machine and for substantially neutralizing the armature reaction, and also to provide a novel method of assembling a winding of a dynamo-electric machine in completely inclosed slots in a magnetic yoke. Other objects of the invention will be brought out in the course of the following description.

In the construction of direct current dynamo-electric machines it is becoming more and more common to use a distributed winding on the field member or stator for producing an exciting flux for the machine and for substantially neutralizing the armature reaction. In applying such windings it has heretofore been customary to slot the pole faces, or the entire periphery of the stator where the field magnet iron is completely distributed, and mount the field winding or windings in the slots. There are two serious objections to this construction. In the first place, in machines of small diameter, to which my present invention is particularly applicable, if open slots are employed it is difficult to assemble a winding of form-wound coils, because the distance between slots is materially greater at the base or bottom of the slots than at the inner periphery of the stator, and in the second place it is advantageous to have the slots closed by magnetic material which preferably should be integral with the stator material. This means that the slots should be tunneled through the material. Where tunneled slots of this character have heretofore been employed it has been necessary to thread the winding through the slots, which is a very expensive process, and for this reason the slots have ordinarily been of the open type closed by magnetic wedges after the winding is assembled. Tunneled slots present no difficulties in a machine constructed in accordance with my present invention, and the field winding or windings can be made of form-wound coils and applied with the same ease as in the winding of the armature of an ordinary direct current machine.

My present invention consists in constructing the field member or field magnet structure of the machine of two magnetic members mechanically secured together with the field winding carried in slots formed in one of the members and closed by the other member. In carrying my invention into effect I make the field magnet structure of an outside magnetic member having a circular or arcual inner periphery and an inside composite magnetic member including a plurality of sector-shaped annular parts having slots cut from their outer periphery nearly to their inner periphery with just enough material left at the inside end or base of each slot to correspond to the magnetic wedge heretofore ordinarily used in closing such a slot. In assembling the field magnet structure, the sector-shaped parts are mounted on the exterior of a suitable work carrier, such as an arbor or mandrel, in the same relative positions they are to occupy in the completed machine, and are secured thereto in any suitable manner, as for example, by bolts or screws. The coils of the field winding are assembled in the slots in the same manner as the armature coils of an ordinary direct current machine, and then the work carrier, with the sector-shaped parts carrying the assembled coils, is placed inside the outer magnetic member of the field magnet and the sector-shaped parts are brought into engagement with the outer magnetic member and secured thereto by suitable bolts or screws. The work-carrier is next disengaged from the sector-shaped parts and withdrawn, leaving a completed field magnetic structure having a winding or windings assembled in distributed slots of the tunneled type.

Figure 3:
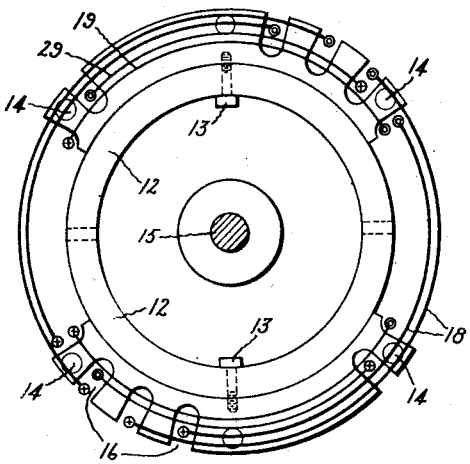
Figure 4:
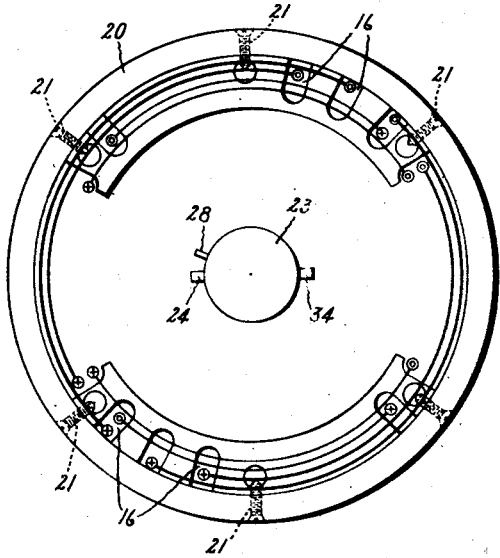
Figure 5:
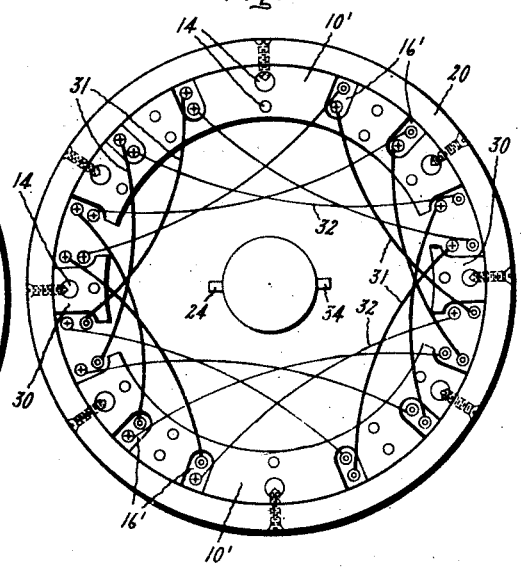
Figure 2:
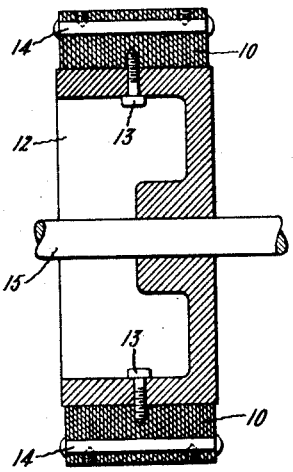

The novel features which I believe to be patently characteristic of my invention are definitely indicated in the claims appended hereto. The principle of my invention and its application to and embodiment in dynamo-electric machines will be more clearly understood from the following description taken in connection with the accompanying drawings, in which;

Figures 1, 2 and 3 are diagrammatic views illustrating the method of assembling a field magnet structure embodying my present invention; Figs. 4 and 5 are diagrammatic views of dynamo-electric machines having field magnet structures embodying the invention.

In Figs. 1 and 2 of the drawings I have shown two bundles of laminations 10 secured to a hollow cylindrical arbor or work-carrier 12 by means of bolts 13. Each of the bundles 10 consists of sector-shaped annular laminations of magnetic material firmly held together by rivets 14. The laminations of the sector-shaped members 10 are provided with slots 16 opening toward the outside when the members are mounted on the arbor. It will be observed from the drawings that the slots 16 are cut from the outside periphery of the laminations nearly to the inside periphery, and the material 17 which is left at the bottom or base of each slot is designed to perform the functions of the magnetic wedge heretofore usually employed. The arbor 12 is mounted upon a shaft 15 and the field winding coils can be assembled in the slots 16 in very much the same way that an ordinary direct current armature is now wound.

Figs. 1 and 2 of the drawings represent the sector-shaped magnetic members 10 mounted on the work-carrier in preparation for the assembling of the field winding in the slots of the members 10. In Fig. 3 of the drawings I have diagrammatically shown the coils 18, 19 and 29 of a three-component field winding assembled in the slots of the magnetic members 10. It will be evident that these coils can be very easily assembled in much the same manner that the armature coils of an ordinary direct current armature are now assembled. The coils 18 are designed to be connected in series with the armature winding and are arranged so that considered alone this component of the field winding will produce a magnetization at an angle of substantially 45 electrical degrees to the axis of the armature magnetization. The coils 19 and 29 are designed to be connected in shunt relation to the whole or a part of the armature winding, as will be explained in more detail hereinafter. When the coils 18, 19 and 29 have been properly assembled, as diagrammatically represented in Fig. 3, the arbor, with the attached magnetic members 10 and assembled coils, is placed inside a ring 20 of magnetic material. The laminated members 10 are then secured to the ring 20 by means of screws 21, after which the bolts 13 are taken out and the arbor removed, leaving a completed bipolar field magnet structure of the character diagrammatically represented in Fig. 4.

Ordinarily the screws 21 will serve to draw the magnetic members 10 into intimate mechanical and magnetic contact with the ring 20, but it will of course be understood that an expanding mandrel may be employed for this purpose if desired. Holes for the bolts 21 are suitably drilled and tapped in the members 10, and since the laminations of these members are very firmly secured together by the rivets 14, the screws 21 will engage in these screw-threaded holes just as securely as in holes in a solid mass. Where the rivets 14 are heavy enough, I have found it advantageous to position the screws 21 so that the holes therefor may be drilled and tapped through or into the rivets, so that the screws may engage the rivets.

The magnetic pull between two magnetic members is proportional to the square of the flux density. The flux density at the slotted or outer periphery of the members 10 is substantially twice the flux density at the inner periphery, because of the smaller amount of material at the slotted outer periphery. The magnetic pull between the magnetic members 10 and 20 is thus approximately four times the magnetic pull between the members 10 and the armature core, and this preponderating magnetic pull assists in holding the magnetic members of the field magnet structure in firm mechanical engagement.

The machine represented in Fig. 4 has a commutated armature winding diagrammatically illustrated by a commutator 23 and cooperating main brushes 24 and 34. An auxiliary brush 28 is so positioned on the commutator that the armature conductors between this brush and the nearer main brush 24 are positioned in an approximately uniform magnetic field over a relatively wide range of the machine's operating speeds. As previously mentioned, the coils 18 are designed to be connected in series with the armature winding and are arranged to produce a magnetization at 45 electrical degrees to the armature magnetization. The coils 19 form a main shunt exciting winding which is connected between the brushes 24 and 34, or between the brushes 28 and 34, while the coils 29 are connected between the brushes 24 and 28 and are arranged as a bucking winding, whose magnetization opposes that of the coils 19. The machine illustrated in Fig. 4 possesses decided series characteristics when operating as a motor, and generates a substantially contant direct current electromotive force over a relatively wide range of speeds when operating as a generator. This machine is particularly adapted for use in electric starting and lighting outfits on motor vehicles. In such outfits the dynamo-electric machine is associated with an internal combustion engine and a storage battery, and operates as a motor supplied with electric energy from the battery for starting the engine and as a generator for charging the battery. The particular arrangement of the windings of the machine shown in Fig. 4 is described and claimed in my copending application for Letters Patent of the United States filed October 13, 1915, Serial No. 55,632.

In Fig. 5 of the drawings I have shown my present invention embodied in a bipolar compensated direct current machine having completely distributed exciting and compensating windings each composed of uniform coils of 50 per cent. pitch. The machine as illustrated is bipolar, and there are four sector-shaped laminated magnetic members. Two of these sector-shaped members 10′ have uniformly distributed slots 16′, corresponding in every respect to the members 10 with the slots 16, shown in Figs. 1, 2, 3, and 4. The other two sector-shaped members 30 are in effect commutating poles or teeth and are composed of laminations of magnetic material firmly held together by rivets. In mounting the sector-shaped members on the work-carrier, preparatory to assembling the coils of the field winding, the sector-shaped members 10′ and 30 are bolted or otherwise suitably secured to the work-carrier in the manner heretofore described in connection with the magnetic members 10. When the members 10′ and 30 have been secured to the work-carrier in their proper relative positions, the coils of the field winding are assembled, and the magnetic members and assembled field winding transferred and secured to the interior of a suitable frame, just as described in connection with Figs. 1, 2, 3 and 4. It will be noted that the laminations of the magnetic members 10′ are firmly held together by two rivets per tooth. Large rivets are used where the holes for the screws 21 are to be drilled and tapped therethrough or thereinto, and smaller rivets are used elsewhere. The machine illustrated in Fig. 5 has a compensating winding composed of uniform coils 31 designed to be connected in series with the armature winding, diagrammatically represented by the commutator 23 and coöperating brushes 24 and 34, and an exciting winding composed of uniform coils 32 designed to be connected in shunt to the armature winding. The coils 31 and 32 are of 50 pe rcent. pitch and are preferably interleaved to form mechanically a single winding. Machines of this type are described and claimed in my copending application for Letters Patent of the United States, filed August 21, 1914, Serial No. 857,851.

The magnetic ring 20 is preferably a solid steel ring. This ring constitutes in effect the frame of the machine and the sector-shaped laminated magnetic members are secured thereto with the field winding mechanically held therebetween. It will thus be evident that, generally, my novel and improved field magnet structure consists of two magnetic members, one of which constitutes the frame of the machine, such as the ring 20. The second magnetic member is composed of a plurality of sector-shaped parts or members, all or only some of which have distributed slots therein which are closed by the first magnetic member or frame, and to this end the two magnetic members have conforming adjacent peripheral surfaces and are firmly fastened together with the slot openings in the one member adjacent to and closed by the other member.

It will be evident from the foregoing description that a field magnet member constructed in accordance with my present invention has in effect the characteristics of a tunneled wound member. The invention secures the advantages of a tunneled winding without the labor heretofore incident to threading the conductors through tunneled slots or holes in the laminations of the field magnet yoke. In accordance with the invention form-wound coils can be easily assembled in slots, which in the completed machine are completely closed, being in effect the equivalent of tunneled slots. The entire field winding for producing the exciting flux of the machine and for substantially neutralizing the armature reaction is carried in these tunneled slots, and the radial depth or thickness of the entire field winding substantially conforms to the depth of the slots.

I have herein shown and particularly described certain embodiments of my invention for the purpose of explaining its principle and showing its application, but numerous modifications of the details of construction and arrangement of these embodiments and other applications will present themselves to those skilled in the art. I, therefore, wish to cover by the following claims all modifications within the spirit of the invention.

What I claim as new and desire to secure by Letters Patent of the United States, is:—

1. The method of assembling a winding of a dynamo-electric machine in completely inclosed slots in a magnetic yoke which consists in mounting upon a work-carrier a magnetic member having slots on its exterior periphery when mounted on the work carrier, mounting a winding in said slots, transferring said work-carrier together with the magnetic member and winding mounted thereon to the interior of a second magnetic member having an interior periphery conforming to the exterior periphery of said first magnetic member, securing said first magnetic member to said second magnetic member, and removing the work-carrier.

2. The method of producing in a dynamo-electric machine a magnetic yoke having in effect a tunnel winding which consists in mounting upon a work-carrier a magnetic member having slots on its exterior periphery when mounted on the work-carrier, assembling form-wound coils in said slots, transferring said work-carrier together with the magnetic member mounted thereon and the assembled coils to the interior of a second magnetic member having an interior periphery conforming to the exterior periphery of said first magnetic member, securing said first magnetic member to said second magnetic member, and removing the work-carrier.

3. A dynamo-electric machine comprising a field magnet structure consisting of an outside magnetic member having a circular inner peripheral surface and an inside composite magnetic member including a plurality of sector-shaped annular parts having slots extending from their outer periphery nearly to their inner periphery with just enough material left at the base of each slot to form an integral inner closure for the slot, means securing said annular parts to said outside magnetic member so that the outer ends of said slots are closed by said outside member, an armature winding rotatably mounted within said annular parts, and a field winding having a radial thickness conforming substantially to the depth of said slots and carried therein and adapted to produce an exciting flux for said machine and to substantially neutralize the reaction of said armature winding.

4. A dynamo-electric machine comprising a frame member of magnetic material, a plurality of annular magnetic members secured to said frame member and having outwardly opening slots closed by said frame member, an armature winding rotatably mounted within said annular members, and a field winding having a radial thickness conforming substantially to the depth of said slots and wholly carried in said slots and adapted to produce an exciting flux for said machine and to substantially neutralize the reaction of said armature winding.

5. A dynamo-electric machine comprising a frame member of magnetic material, a plurality of magnetic members each of which has a circular inner surface and a plurality of slots extending from its outer surface nearly to its inner surface, said magnetic members being secured to said frame member with the slot openings adjacent to and closed by the frame member, an armature winding rotatably mounted within said magnetic members, and a field winding for producing an exciting flux for said machine and for substantially neutralizing the reaction of said armature winding carried in said slots.

6. A dynamo-electric machine comprising a magnetic frame member having a substantially cylindrical inner surface, a plurality of sector-shaped annular members of magnetic material each of which has a plurality of slots extending from its outer convex surface nearly to its inner concave surface, said annular members being only slightly less in arcual length than the polar arc of said machine, means securing said annular members to said frame member so that the open ends of the slots in the annular members are closed by said frame member, an armature winding rotatably mounted within said annular members, and a field winding for producing an exciting flux for said machine and for substantially neutralizing the reaction of said armature winding carried in said slots.

7. A dynamo-electric machine comprising a magnetic frame member having a substantially cylindrical inner surface, a plurality of sector-shaped annular members of magnetic material each having an arcual length only slightly less than the polar arc of said machine, each of said annular members having a plurality of slots extending from its outer convex surface nearly to its inner concave surface, means securing said annular members to said frame member so that the open ends of the slots in the annular members are closed by said frame member, magnetic commutating members secured to said frame member between the ends of each adjacent pair of said annular members and separated therefrom by relatively wide slots, an armature winding rotatably mounted within said magnetic members, and a field winding for producing an exciting flux for said machine and for substantially neutralizing the reaction of said armature winding carried in the slots of said annular members and in the relatively wide slots between said annular members and said communicating members.

8. A dynamo-electric machine comprising a magnetic frame member, a plurality of magnetic members symmetrically arranged within said frame member and secured thereto, each of said magnetic members having a plurality of outwardly opening slots whose open ends are adjacent to and closed by the frame member, magnetic commutating members secured to said frame member between the ends of each adjacent pair of said magnetic members and separated therefrom by relatively wide slots, an armature winding rotatably mounted within said magnetic members, and a field winding for producing an exciting flux for said machine and for substantially neutralizing the reaction of said armature winding carried in the slots of said magnetic members and in the relatively wide slots between said magnetic members and said commutating members.

In witness whereof, I have hereunto set my hand this 15th day of October, 1915.

SVEN R. BERGMAN.

It is hereby certified that in Letters Patent No. 1,257,178, granted February 19, 1918, upon the application of Sven R. Bergman, of Nahant, Massachusetts, for an improvement in "Dynamo-Electric Machines," errors appear in the printed specification requiring correction as follows: Page 3, line 4, for the word "contant" read *constant;* page 4, lines 120–121, claim 7, for the word "communicating" read *commutating;* and that the said Letters Patent should be read with these corrections therein that the same may conform to the record of the case in the Patent Office.

Signed and sealed this 23d day of April, A. D., 1918.

[SEAL.]

F. W. H. CLAY,

*Acting Commissioner of Patents.*

Cl. 171—252.